Oct. 30, 1962     K. D. SCHREYER     3,060,866
INTERLOCKING MECHANISM FOR CONVEYORS
Filed Nov. 14, 1958     4 Sheets-Sheet 1
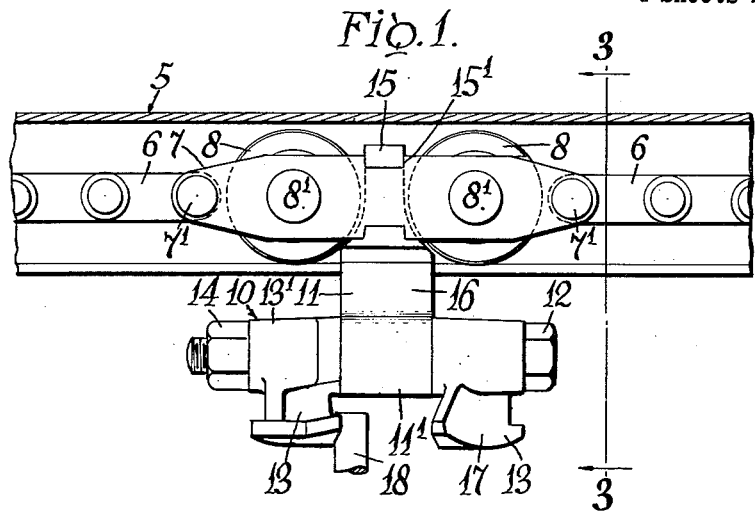
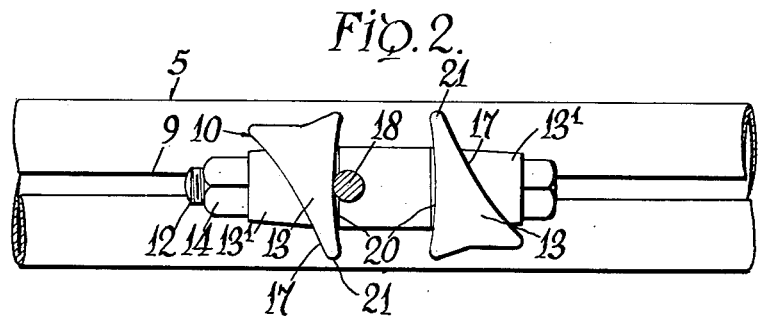
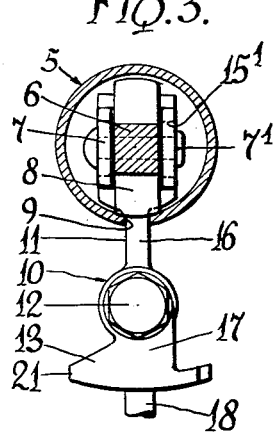
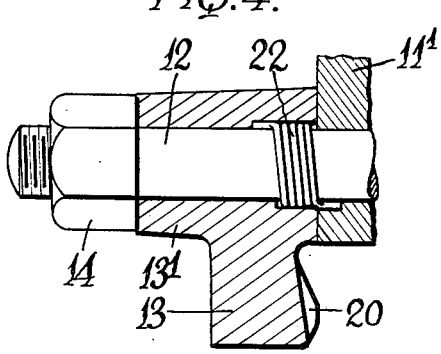
INVENTOR.
*Kenneth D. Schreyer*
BY
*Beau, Brooks, Buckley + Beau*
ATTORNEYS Oct. 30, 1962 K. D. SCHREYER 3,060,866
INTERLOCKING MECHANISM FOR CONVEYORS
Filed Nov. 14, 1958 4 Sheets-Sheet 2
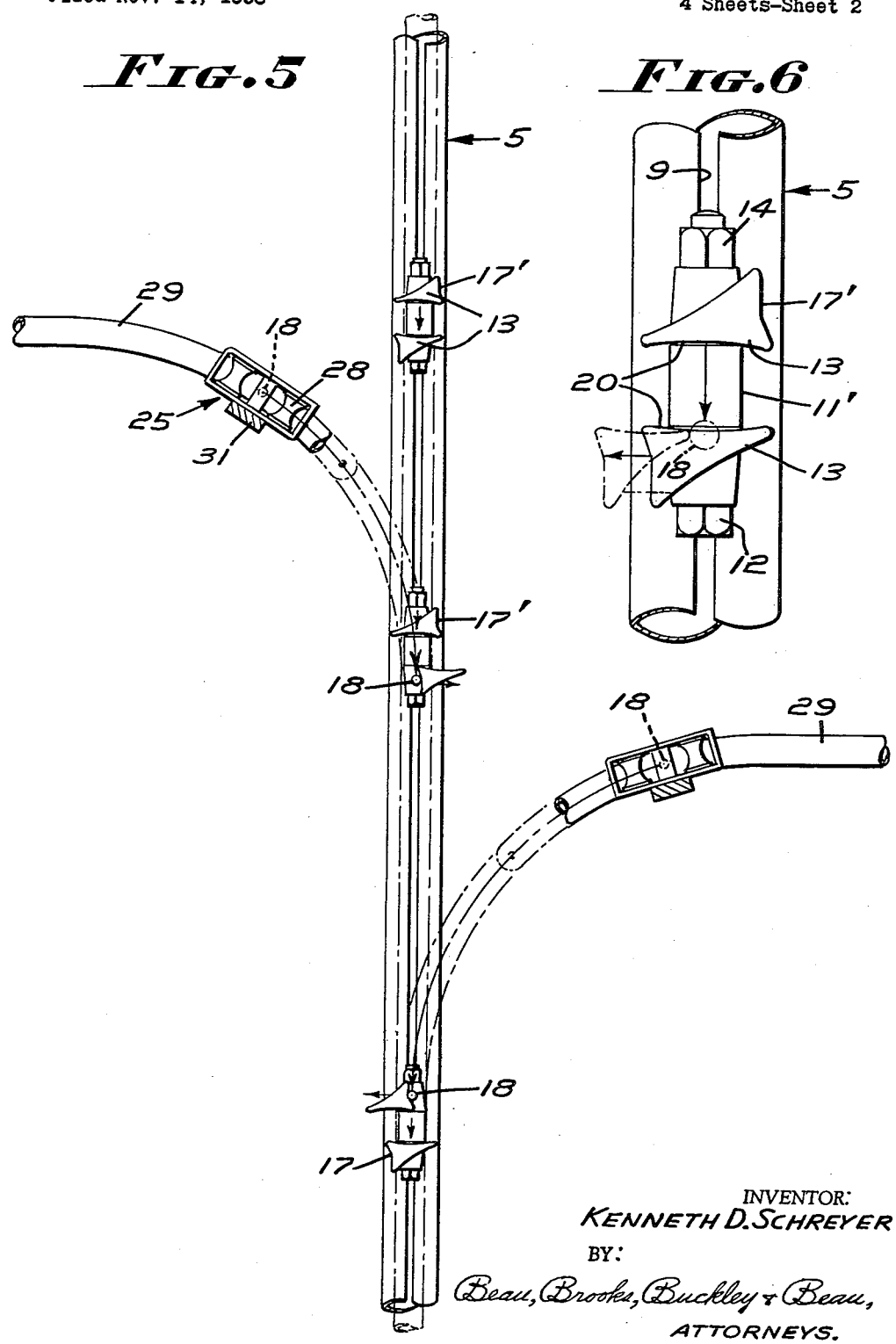
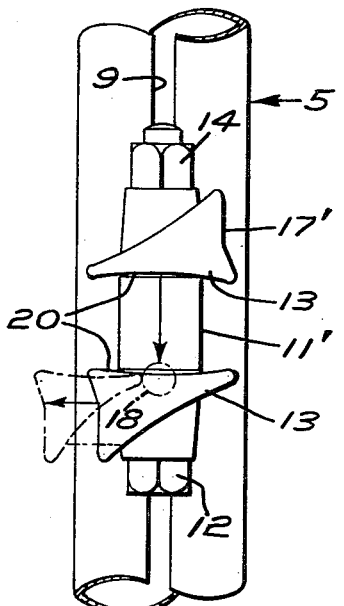
INVENTOR:
KENNETH D. SCHREYER
BY:
Beau, Brooks, Buckley & Beau,
ATTORNEYS.

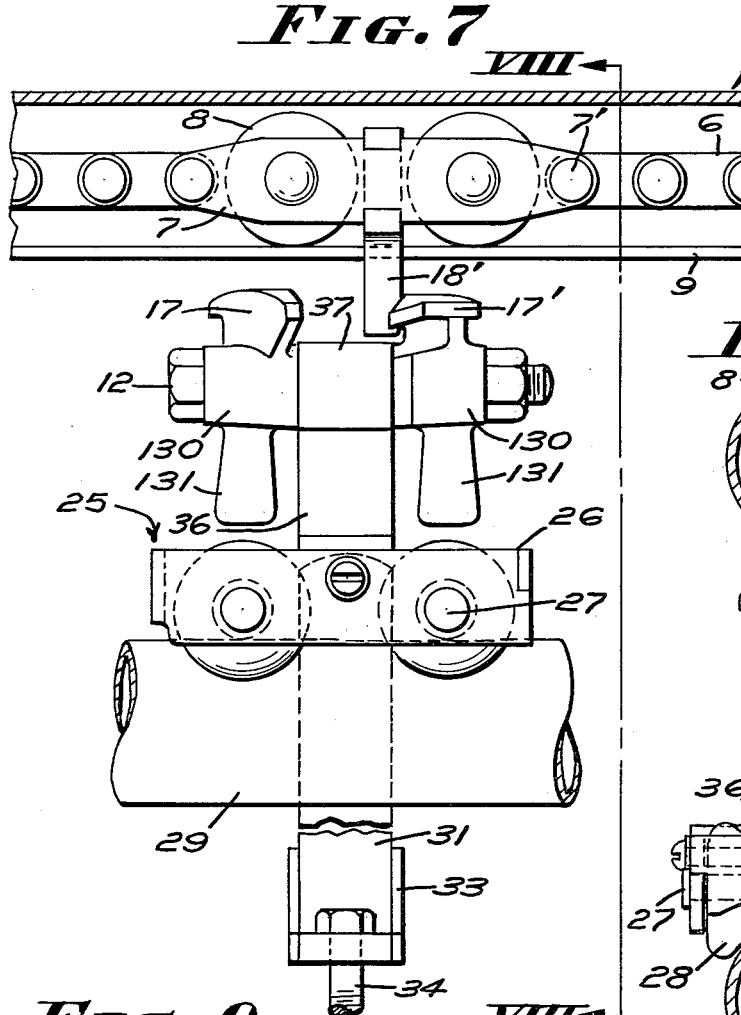
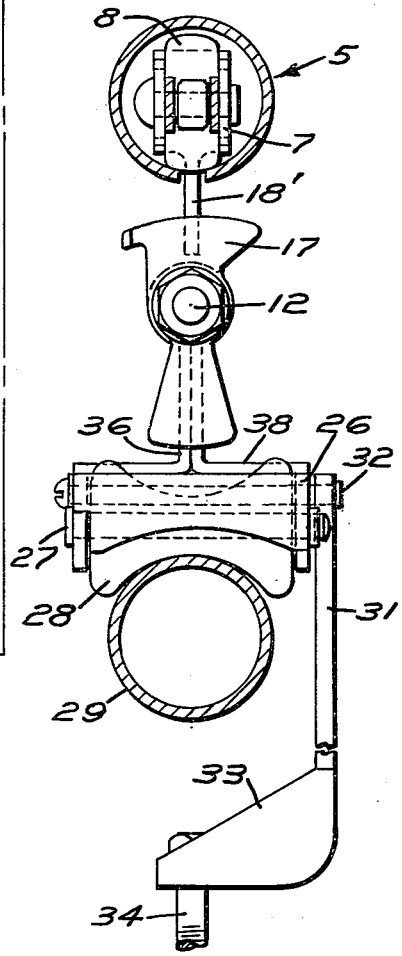
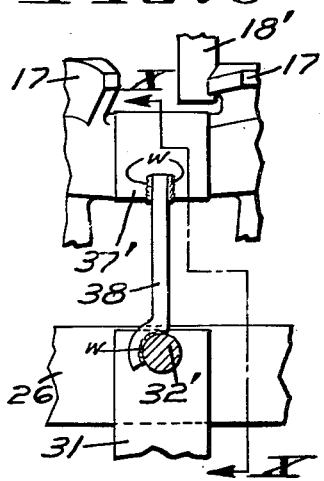
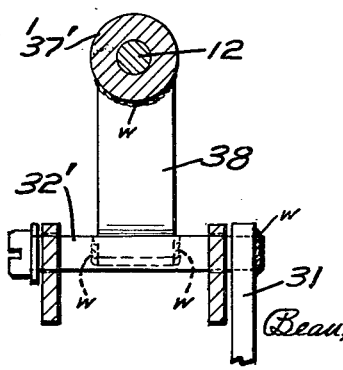

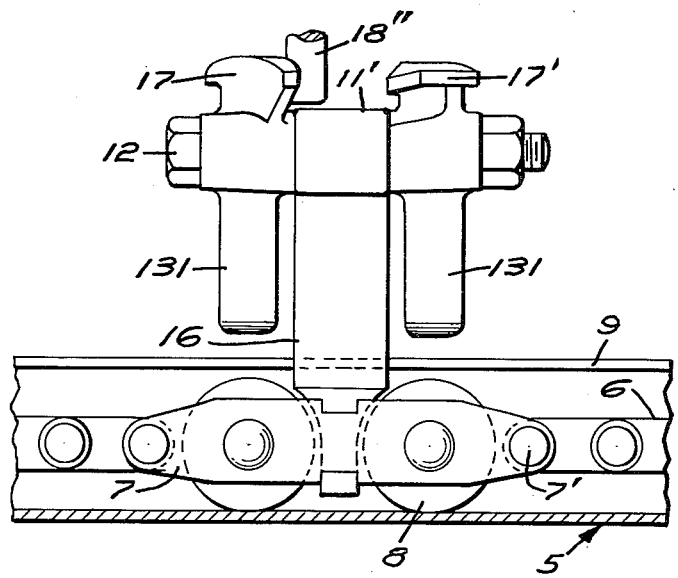
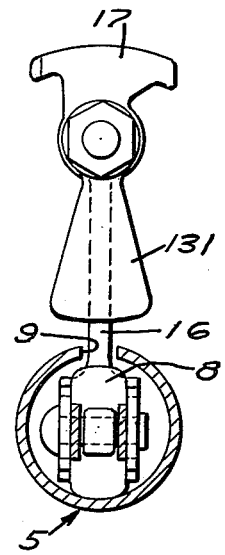
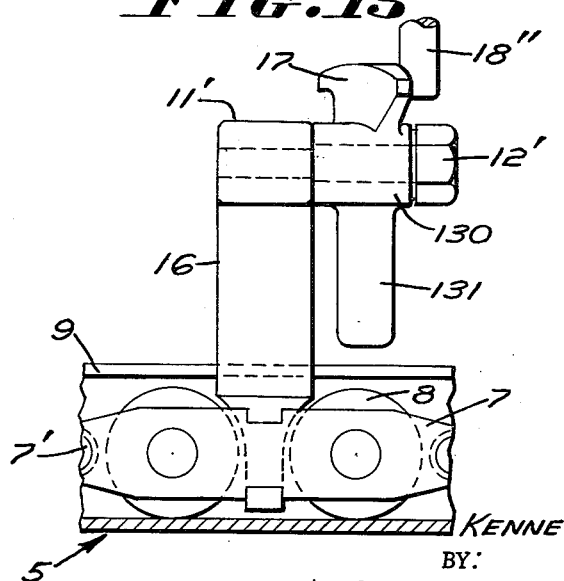

United States Patent Office 3,060,866
Patented Oct. 30, 1962

3,060,866
INTERLOCKING MECHANISM FOR CONVEYORS
Kenneth D. Schreyer, Snyder, N.Y., assignor to Columbus
McKinnon Corporation, Tonawanda, N.Y.
Filed Nov. 14, 1958, Ser. No. 777,535
3 Claims. (Cl. 104—172)

This invention relates generally to the conveyor art, and more specifically to a new and useful mechanism for releasably interlocking a conveyor trolley and a drive chain. This application is a continuation-in-part of my pending application Serial No. 637,406, filed January 31, 1957, now abandoned.

While not necessarily limited thereto, this invention is particularly concerned with power and free type conveyors such as are commonly used in manufacturing and warehousing for example, wherein the material being conveyed is suspended from a trolley which is moved along a trolley rail by a pusher or drive member carried by a power driven chain. The mechanism of my invention can be carried by the chain to comprise the drive member, in which case the trolley head carries a driven member in the form of a projecting driver lug for being engaged by the mechanism to propel the trolley along its rail. Alternately, the mechanism of my invention can be carried by the trolley head and the driver lug by the chain. Also, the drive chain can be disposed either above or below the trolley rail. In either case, the operation of my interlocking mechanism remains the same.

In one customary type system the pusher elements heretofore used are rigid, whereby initial contact with the drive lug must be made manually to prevent interference between the pusher and the driver lug. Otherwise, if the trolley drive lug and the rigid pusher initially engaged in side-by-side relation, they would jam and damage the pusher. Furthermore, such pusher elements engage the lugs on only the trailing side thereof, whereby continuous contact cannot be maintained on descending slopes and the trolley runs away from its pusher.

Accordingly, it is an object of this invention to provide a pusher mechanism which will engage a conveyor trolley driver lug in a manner maintaining control thereover at all times.

Another object of this invention is to provide a pusher mechanism which is yieldable to interlock automatically with the driver lug when the latter approaches the former from either side, as well as upon relative endwise movement, and regardless of the direction of travel thereof.

Still another object of this invention is to provide a pusher mechanism having the foregoing characteristics and which can be substituted readily for conventional pushers in existing installations without altering the conventional drive chain.

A mechanism constructed in accord with this invention is characterized by the provision of an element adapted to receive a trolley driver lug thereagainst for driving engagement therewith, the element being mounted to swing about an axis generally alined with the direction of travel and thereby to permit a drive lug to pass by the element.

The foregoing and other objects, advantages and characterizing features of a conveyor trolley pusher mechanism constructed in accord with this invention will become readily apparent from the ensuing detailed description of certain presently preferred embodiments thereof, taken in conjunction with the accompanying drawings illustrating such embodiments and forming a part hereof wherein like reference numerals denote like parts throughout the various views and wherein:

FIG. 1 is a side elevational view of one form of a trolley pusher mechanism of this invention in operation, the drive chain housing being shown in longitudinal section;

FIG. 2 is a bottom plan view thereof;

FIG. 3 is an end elevational view thereof, taken about on line III—III of FIG. 1, the drive chain and its housing being shown in transverse section;

FIG. 4 is a fragmentary longitudinal sectional view of one of the pusher elements thereof;

FIG. 5 is a bottom plan, schematic view thereof illustrating its mode of operation upon sidewise engagement with a driver lug;

FIG. 6 is a fragmentary detail view illustrating such operation;

FIG. 7 is a view corresponding to FIG. 1, but showing a modification;

FIG. 8 is a view thereof taken about on line VIII—VIII of FIG. 7;

FIG. 9 is a fragmentary view of another modification;

FIG. 10 is a view thereof taken about on line X—X of FIG. 9;

FIG. 11 is a view corresponding to FIGS. 1 and 7, but showing a further modification;

FIG. 12 is an end elevation thereof, the drive chain and its housing being shown in section; and FIG. 13 is a view corresponding to FIG. 11, but showing still another form of my invention.

In the accompanying drawing, numeral 5 designates an elongated, tubular housing member which in use will be suitably suspended from a ceiling or other support, or mounted in a floor, and within which a drive chain 6 is moved by suitable means, not illustrated. At predetermined spaced points therealong the chain links are joined by a pair of laterally spaced, elongated flat links 7 which are joined together and to the chain 6 by appropriate pins 7' and which support a pair of roller wheels 8 journaled on axles 8', such as rivets or the like, rollers 8 being mounted on suitable bearings, not illustrated.

Rollers 8 bear against the inner bottom wall of housing 5, thereby supporting chain 6 as it moves through housing 5, and the housing is provided with a longitudinal slot 9 in the wall thereof.

The trolley pusher mechanism of my invention is generally designated 10 in FIGS. 1–6 and comprises a pendant body portion 11 carried by links 7 and supporting a pin 12, alined lengthwise of housing 5, on which a pair of opposed pusher elements 13 are suspended.

Body 11 is of generally rectangular cross sectional shape adjacent its upper end and is provided thereat on opposite sides thereof with depressions or recesses forming vertically spaced lugs 15 adapted to be received by and interlock with notched medial portions 15' of links 7, as clearly illustrated in FIG. 1. Body or shank 11 is formed immediately below its upper end portion with an intermediate, neck portion 16 of reduced thickness, providing an upper attaching portion elongated transversely of housing 5 and a thin neck portion therebelow elongated longitudinally of housing 5 and received within slot 9 for movement therealong.

The lower end portion of body 11 comprises an elongated, tubular portion 11' of generally cylindrical outline aligned lengthwise of member 5 and receiving pin 12, which can be in the form of a bolt, therethrough. Pusher elements 13 are provided with tubular body portions 13' of generally cylindrical outline which are mounted on pin 12 on opposite sides of body portion 11', being held thereon as by a lock nut 14 and are adapted to receive therebetween a driven lug 18 which in the embodiment of FIGS. 1–6 is carried by the conveyor trolley.

The trolley can be of any appropriate construction, such as illustrated by way of example in FIGS. 5, 7 and 8 wherein there is shown a trolley 25 comprising a generally rectangular frame 26 formed by mating L-shaped members held together by bolts 27 forming axles for spool type wheels 28, which latter engage a tubular trolley rail 29. An arm 31 depends from frame 26, being pivoted thereon by bolt 32 at a point between spools 28, and can conveniently comprise an angle reinforced by gusset plates 33. A load carrying pin 34 depends from arm 31 in centered relation to trolley rail 29. In the embodiment of FIG. 5, lug 18 is carried by a cross piece 35 secured to frame 26 between spools 28, generally as more fully described in my pending application Serial No. 633,643, filed January 11, 1957, now patent 2,968,257.

It is a particular feature of this invention that the pusher elements 13 are arranged to yield and automatically permit passage of driver lug 18 to operative position therebetween, in the following manner.

Pusher elements 13 are identical in construction, but mounted in opposed relation, whereby for simplicity only one thereof will be described in detail. Each pusher element is formed with a pendant portion having an inner face 20 elongated transversely of housing 5 and adapted to bear against the drive lug 18, one pusher element engaging lug 18 when chain 6 is proceeding in one direction, and the other pusher element engaging lug 18 when the chain is proceeding in the opposite direction. In addition, each inner face 20 is of slightly concave transverse curvature, to automatically center lug 18 with respect to the pusher element and thereby provide a direct and positive transfer of power from the pusher element 13 to drive lug 18 in alinement therewith.

The outer faces of pusher elements 13 are provided with cam surfaces 17 formed so that when the outer face of either pusher element abuts drive lug 18 it is automatically cammed thereby about pin 12 out of the path of lug 18, permitting the latter to pass into the space between the pusher elements. The pusher element 13 which has been cammed out of the way by the lug 18 then swings back to its operative position, illustrated in the drawings, under the influence of gravity.

Thus, each pusher element 13 is journaled on pin 12 for swinging about the longitudinal axis thereof which is generally alined with the direction of travel of elements 13, and it is a particular feature of the invention that as the pusher mechanism is moved endwise into initial engagement with drive lug 18 the leading pusher element 13 is automatically cammed out of interfering relation with lug 18, as shown in FIG. 6, yielding to permit passage of the lug into the space between the elements 13 for being rigidly engaged by the inner face of the trailing pusher element. Once lug 18 has passed, the leading pusher element 13 automatically swings back to its operative position positively locking drive lug 18 between the pusher elements.

In addition, the pusher elements 13 are provided with a cam surface on their side face as illustrated at 17' for being cammed laterally upon sidewise engagement with a driver lug 18. This adapts the mechanism of my invention to use with a system having branch trolley rails 29, as illustrated in FIG. 5, which branch rails bring the trolleys in to alinement with the chain housing 5 with the driver lug and the pusher elements at the same level. If lug 18 is positioned so as to be engaged by cam surface 17' it will pivot the pusher element as required to clear it, and will be engaged by the next pusher element which presents a face 20 for engagement therewith.

Therefore, the pusher elements yield in either direction and coupling is automatic, whereby even if the lug 18 initially engages a pusher element 13 on the side thereof, the pusher element yields without binding and the lug is picked up either by the succeeding pusher element or the succeeding pusher mechanism, and when the parts are coupled the pusher maintains control over the trolley at all times. Even if the trolley suddenly begins going down hill, moving away from the trailing pusher element 13, it will simply engage the inner face of the leading pusher element 13 which will hold the lug coupled to the pusher. Also, uncoupling is automatic.

Rotation of pusher elements 13 about the axis of pin 12 is limited by the opposite ends of the inner faces 20, and the depending portion of elements 13 is balanced so as to cause the elements to return to the normal, centered position illustrated in the drawing under the influence of gravity. If desired, to further assure return of the pusher elements to driving position each element can be provided with a biasing spring 22 which can encircle pin 12 and have one end fixed to body portion 11' and its other end fixed to the pusher element 13 (FIG. 4). With this arrangement, camming of pusher element 13 out of the way by drive lug 18 stresses the associated spring 22 which thereafter restores that pusher element to its operative position.

The driver lug can be carried by the drive chain, and the pusher elements by the trolley, as illustrated in FIGS. 7 and 8, wherein driver lug 18' is carried by links 7 of the drive chain. Pusher elements 130 are pivotally supported by bolt 12 on a strap member 36 formed to provide an eye 37 receiving bolt 12 and oppositely directed legs 38 spanning the trolley head and secured to frame 26. The mechanism operates in the identical manner as in the embodiment of FIGS. 1–6, with the pusher elements 130 pivoting about the axis of bolt 12 to yield and permit passage of the driver lug 18' upon either endwise or sidewise engagement therewith. Elements 130 are provided with pendulum portions 131 to cause return thereof to their normal position alined with the direction of travel.

An alternate construction is shown in FIGS. 9 and 10 wherein the bolt 12 is supported in a generally cylindrical housing 37' secured to an upright 38 which is in turn secured to the pin 32' from which arm 31 is suspended.

Also, the chain housing 5 need not be over the trolley rail, but can be therebelow, as in the in-floor arrangement illustrated in FIGS. 11 and 12. Here, the pusher elements 130 of FIGS. 7–10 are mounted in a manner similar to that of FIGS. 1–4, but project upwardly. The operation remains the same. In addition, in some instances a mechanism having only one pusher element might suffice, as illustrated in FIG. 13, the operation otherwise remaining the same as previously described.

Accordingly, it is seen that the instant invention fully accomplishes the foregoing objects, and it will be appreciated that while only certain presently preferred embodiments of the invention have been disclosed herein, the same is not limited to the details thereof which can be varied and modified within the spirit of the invention and the scope of the appended claims.

Having fully disclosed and completely described my invention, together with its mode of operation, what I claim as new is:

1. In a conveyor system of the type having a load carrying driven member and a driving member therefor, one of such members having a lug extending therefrom for movement therewith, an interlocking drive connection mechanism comprising, a body adapted for connection to the other of such members for movement therewith, and a cam element carried by said body for engaging said lug to establish a drive connection therebetween, said cam element being pivotal on said body only about an axis extending generally in the direction of movement of said body for swinging laterally of said direction of movement to enable passage of said lug by said cam element.

2. In a conveyor system having a load carrying driven member and a driving member therefor, one of said members having a lug extending therefrom for movement therewith, an interlocking drive connection mechanism comprising, a body connected to the other of said members for movement therewith, and a pair of opposed cam elements carried by said body in spaced apart relation along the direction of movement of said body and normally assuming a position for confining said lug therebetween to establish a drive connection therewith, said cam elements being pivotally mounted on said body only about an axis generally parallel to said direction of movement of said body for swinging laterally relative to each other and to said direction of movement of said body to enable passage of said lug into position between said cam elements.

3. A pusher mechanism for conveyor trolleys and the like comprising, a body, a pusher element carried by said body for engaging conveyor trolley driver lug and the like, said pusher element normally assuming a position for driving engagement with a driver lug and the like and having an inner surface for engaging a driver lug and moving the same, said pusher element being pivotally mounted on said body only for movement laterally relative thereto about an axis generally parallel to the direction of movement of said body out of said driving position, and said pusher element having a cam surface which upon abutting a driver lug and the like the latter will cam the element out of said position.

References Cited in the file of this patent

UNITED STATES PATENTS

| | | |
|---|---|---|
| 2,510,318 | Rose | June 6, 1950 |
| 2,621,609 | McCaul et al. | Dec. 16, 1952 |
| 2,621,610 | Boyko et al. | Dec. 16, 1952 |
| 2,689,036 | Mullen et al. | Sept. 14, 1954 |
| 2,839,009 | Francis | June 17, 1958 |
| 2,871,799 | King | Feb. 3, 1959 |
| 2,883,942 | Johnson | Apr. 28, 1959 |

FOREIGN PATENTS

| | | |
|---|---|---|
| 41,752 | France | Jan. 16, 1933 |